US011144739B1

(12) United States Patent
Manthrayil Sachidanandan et al.

(10) Patent No.: US 11,144,739 B1
(45) Date of Patent: Oct. 12, 2021

(54) METHOD TO ELIMINATE RFID CROSS READS FOR RFID POINT OF SALE SCANNERS USING IMAGER OBJECT TRACKING

(71) Applicant: ZEBRA TECHNOLOGIES CORPORATION, Lincolnshire, IL (US)

(72) Inventors: Umesh Manthrayil Sachidanandan, Bangalore (IN); Sajan Wilfred, Kollam (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/928,792

(22) Filed: Jul. 14, 2020

(51) Int. Cl.
*G06K 7/10* (2006.01)
(52) U.S. Cl.
CPC ..... *G06K 7/10297* (2013.01); *G06K 7/10415* (2013.01)
(58) Field of Classification Search
CPC ........... G06K 7/10297; G06K 7/10415; G06K 7/10425; G06K 7/10435
See application file for complete search history.

(56) References Cited

U.S. PATENT DOCUMENTS 9,734,368 B1 * 8/2017 Kantor ...................... G01S 5/02
2012/0166241 A1 * 6/2012 Livingston ......... G06Q 10/0631
705/7.12

* cited by examiner

*Primary Examiner* — Laura A Gudorf
(74) *Attorney, Agent, or Firm* — Yuri Astvatsaturov

(57) ABSTRACT

Techniques for eliminating RFID cross-reads for RFID point of sale scanners using imager object tracking are disclosed herein. An example method includes measuring, by an imager a series of displacements of an object from a center of the field of view (FOV) of the imager, over a timeframe; measuring, by an RFID reader, a series of received signal strengths for an RFID tag over the same timeframe; comparing the series of displacements to the series of received signal strengths over the timeframe to determine a measure of similarity between the series of displacements of the object from the center of the FOV of the imager and the series of received signal strengths for the RFID tag over the timeframe; and responsive to the measure of similarity exceeding a threshold measure of similarity, adding a record associated with the RFID tag to a transaction log.

10 Claims, 7 Drawing Sheets

METHOD TO ELIMINATE RFID CROSS READS FOR RFID POINT OF SALE SCANNERS USING IMAGER OBJECT TRACKING

BACKGROUND

In many retail environments, checkout stations are outfitted with radio-frequency identification (RFID) readers for identifying RFID tags attached to items to be purchased. Generally speaking, RFID tags do not need to be within a "line of sight" of the RFID reader to be identified by the RFID reader, which allows users to easily purchase many items simultaneously. However, in retail environments with multiple checkout stations that include RFID readers, an RFID reader at one checkout station may sometimes "cross-read" an RFID tag attached to an that a user is attempting to purchase at a different checkout station nearby, resulting in the item being added to the incorrect user's transaction log. While it is possible to set up metal barriers or RF shielding enclosures between checkout stations to prevent cross-reading of RFID tags between checkout stations, these types of barriers require additional mechanical setup and cost, can be cumbersome, and limit the usage flexibility of the checkout station. Moreover, while it is possible to reduce the range of the RFID reader so that only RFID tags very close to a given checkout station's RFID reader can be read by that RFID reader, this reduced working distance can be inconvenient for users attempting to purchase large or heavy objects that are difficult to bring close to the RFID reader, and can prevent lower-sensitivity RFID tags from being identified by the RFID reader. Furthermore, while it is possible to implement directional RFID antennas to reduce the directional field of view (FOV) of the RFID reader associated with a given checkout station, this reduced FOV can still result in cross-reads due to reflections within the retail environment. Accordingly, there is a need for improved techniques for preventing cross-reads for an RFID reader at a checkout station in a retail environment including many other checkout stations.

SUMMARY

In an embodiment, the present invention is a method, comprising: measuring, by an imager, a series of displacements of an object passing through a field of view (FOV) of the imager, from a center of the FOV of the imager, over a timeframe, the FOV of the imager including a product-scanning region; measuring, by a radio-frequency identification (RFID) reader, a series of received signal strengths for an RFID tag over the same timeframe; comparing the series of displacements of the object from the center of the FOV of the imager over the timeframe to the series of received signal strengths for the RFID tag over the timeframe to determine a measure of similarity between the series of displacements of the object from the center of the FOV of the imager over the timeframe and the series of received signal strengths for the RFID tag over the timeframe; and responsive to the measure of similarity exceeding a threshold measure of similarity, adding a record associated with the RFID tag to a transaction log.

In a variation of this embodiment, the RFID tag is attached to or otherwise associated with the object.

Furthermore, in a variation of this embodiment, comparing the series of displacements of the object from the center of the FOV of the imager over the timeframe to the series of received signal strengths for the RFID tag over the same timeframe includes: comparing a first time within the timeframe associated with a peak in the series of displacements of the object from the center of the FOV of the imager over the timeframe to a second time within the timeframe associated with a peak in the series of received signal strengths for the RFID tag.

Moreover, in a variation of this embodiment, comparing the series of displacements of the object from the center of the FOV of the imager over the timeframe to the series of received signal strengths for the RFID tag over the timeframe includes: comparing a curve of the series of displacements of the object from the center of the FOV of the imager over the timeframe to a curve of the series of received signal strengths for the RFID tag.

Additionally, in a variation of this embodiment, the RFID tag is a first RFID tag, the series of received signal strengths is a first series of received signal strengths, and the measure of similarity is a first measure of similarity, and the method further comprises: measuring, by the RFID reader, a second series of received signal strengths for a second RFID tag over the same timeframe; comparing the series of displacements of the object from the center of the FOV of the imager over the timeframe to the second series of received signal strengths for the second RFID tag over the timeframe to determine a second measure of similarity between the series of displacements of the object from the center of the FOV of the imager over the timeframe and the second series of received signal strengths for the second RFID tag over the timeframe; and responsive to the second measure of similarity failing to exceed the threshold measure of similarity, not adding any record associated with the second RFID tag to the transaction log.

In another embodiment, the present invention is an apparatus including: an imager configured to measure a series of displacements of one or more objects passing through a FOV of the imager, from a center of the FOV of the imager, over a timeframe, the FOV of the imager including a product-scanning region; an RFID reader configured to measure a series of received signal strengths for an RFID tag over the timeframe; a memory storing computer-readable instructions; and a processor configured to execute the computer-readable instructions stored on the memory to: compare the series of displacements of the object from the center of the FOV of the imager over the timeframe to the series of received signal strengths for the RFID tag over the timeframe to determine a measure of similarity between the series of displacements of the object from the center of the FOV of the imager over the timeframe and the series of received signal strengths for the RFID tag over the timeframe; and responsive to the measure of similarity exceeding a threshold measure of similarity, adding a record associated with the RFID tag to a transaction log.

In a variation of this embodiment, the RFID tag is attached to or otherwise associated with the object.

Furthermore, in a variation of this embodiment, the processor is configured to execute the computer-readable instructions stored on the memory to compare the series of displacements of the object from the center of the FOV of the imager over the timeframe to the series of received signal strengths for the RFID tag over the timeframe by comparing a first time within the timeframe associated with a peak in the series of displacements of the object from the center of the FOV of the imager over the timeframe to a second time within the timeframe associated with a peak in the series of received signal strengths for the RFID tag.

Moreover, in a variation of this embodiment, the processor is configured to execute the computer-readable instructions stored on the memory to compare the series of displacements of the object from the center of the FOV of the imager over the timeframe to the series of received signal strengths for the RFID tag over the timeframe by comparing a curve of the series of displacements of the object from the center of the FOV of the imager over the timeframe to a curve of the series of received signal strengths for the RFID tag.

Additionally, in a variation of this embodiment, the RFID tag is a first RFID tag, the series of received signal strengths is a first series of received signal strengths, the measure of similarity is a first measure of similarity, the RFID reader is further configured to measure a second series of received signal strengths for a second RFID tag over the timeframe, and the processor is configured to execute the computer-readable instructions stored on the memory to: compare the series of displacements of the object from the center of the FOV of the imager over the timeframe to the second series of received signal strengths for the second RFID tag over the timeframe to determine a second measure of similarity between the series of displacements of the object from the center of the FOV of the imager over the timeframe and the second series of received signal strengths for the second RFID tag over the timeframe; and responsive to the second measure of similarity failing to exceed the threshold measure of similarity, not add any record associated with the second RFID tag to the transaction log.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
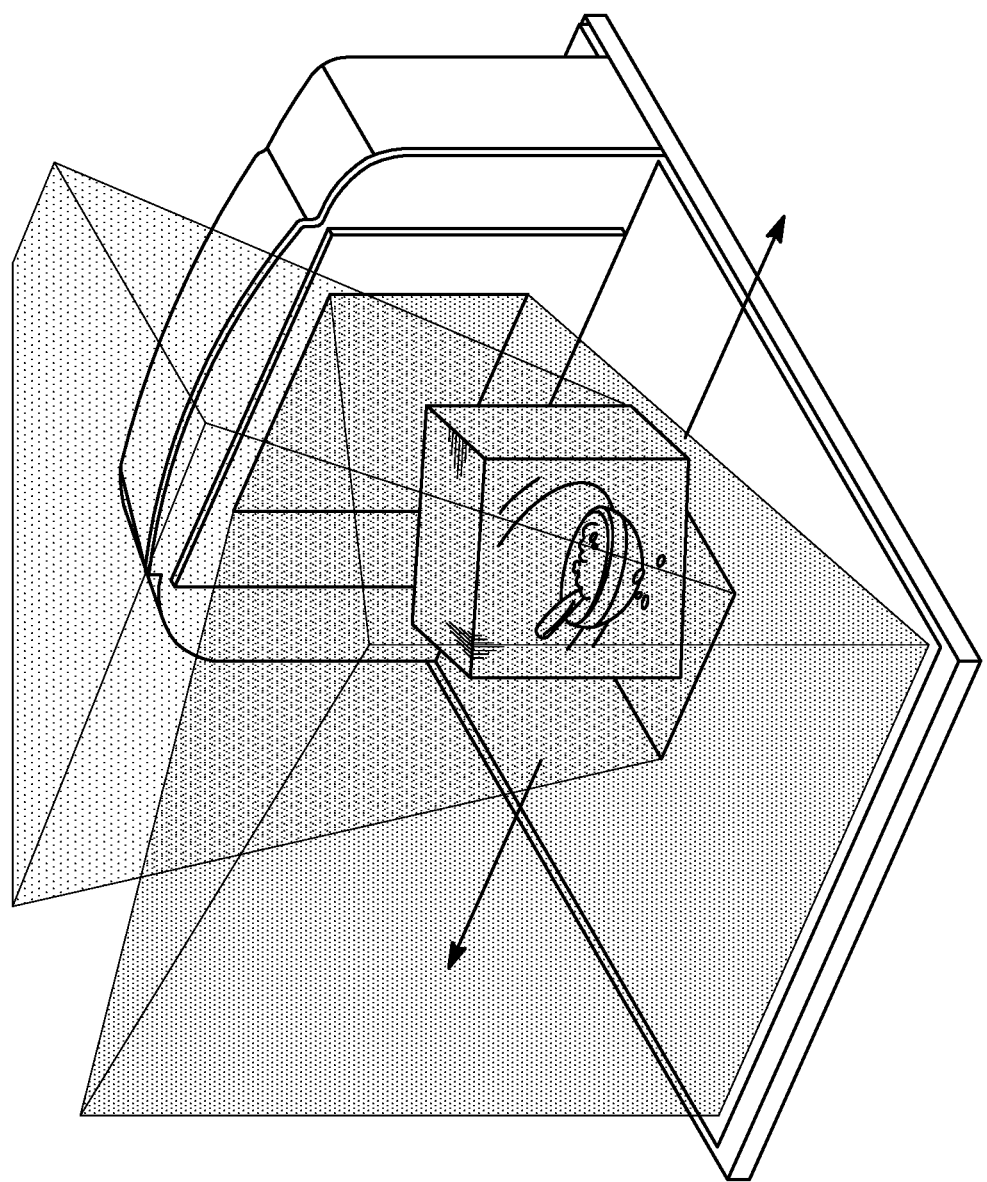
FIG. 1A illustrates an example of a target object moving through the field of view (FOV) of an imager at a checkout station.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques for utilizing an imager at a checkout station to eliminate cross-reads by a radio-frequency identification (RFID) reader at the checkout station. Many existing checkout stations that include an RFID reader also include an imager, e.g., for barcode reading or loss prevention purposes. Typically, this imager remains idle while RFID operation is in progress. However, by operating the imager and the RFID reader simultaneously at the checkout station, it is possible to greatly reduce the incidence of cross-reads by the RFID reader. Specifically, the RFID reader may perform continuous inventory of RFID-tagged objects as they are moved through a product-scanning region associated with the checkout station, and thereby can also continuously assess the received signal strength of the response from the RFID tags in the RFID reader's field of view (FOV). In parallel, the imager may track objects as they are moved through the product-scanning region to assess the proximity of each object to the center of the imager frame. The correlation in time between the position of objects tracked in the imager frame and the each RFID tag's received signal strength allows the system to match each RFID tag read by the RFID reader to an object in the FOV of the imager and add these objects to the customer's transaction log, while preventing any RFID tags read by the RFID reader that are not in the imager's FOV from being added to the customer's transaction log. A stray tag's RSSI will not correlate to the change in displacement of any object in imagers field of view—it typically will have a very low RSSI value with RSSI gradually fading or increasing linearly and not peaking and reducing, as should be the case of tags of interest moved across the imager's field of view.

Figure 1B:
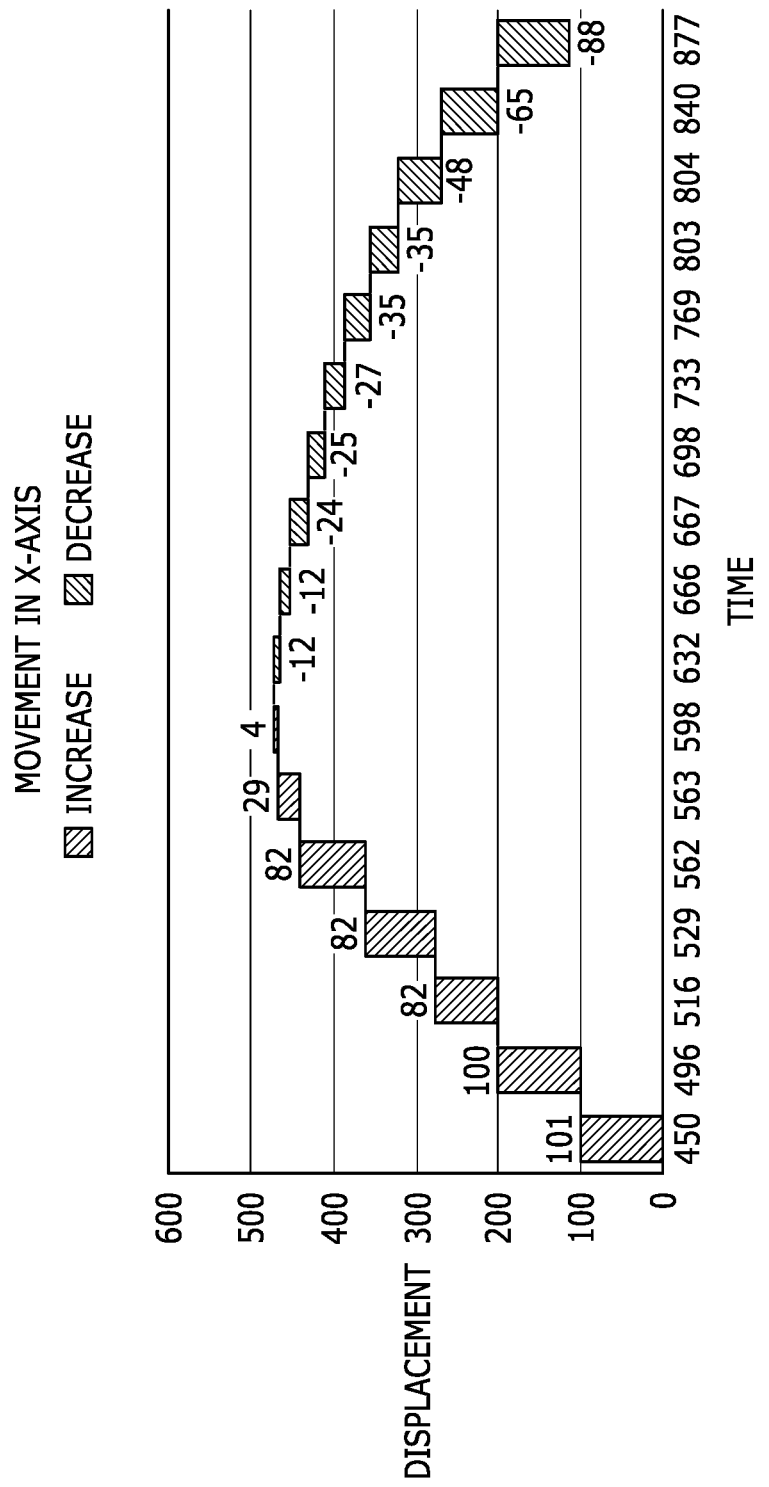
FIG. 1B is a graph illustrating an example series of x-axis displacements of the target object of FIG. 1A from the center of the FOV of the imager over time.

FIG. 1A illustrates an example of a target object passing through the FOV of an imager at a checkout station as it is moved through a product-scanning region of the checkout station. While FIG. 1A illustrates two imagers having different FOVs, a single imager having a single FOV may be used in some embodiments. FIG. 1B is a graph illustrating an example series of x-axis displacements of the target object of FIG. 1A from the center of the FOV of one of the imagers over time. As shown in FIG. 1B, as the target object is moved across the product-scanning region (e.g., as the target object moves from left to right across the product-scanning region), the target object moves through the FOV of the imager such that the x-axis displacement of the target object is initially further from the center of the FOV of the imager, approaches the center of the FOV of the imager, reaches the center of the FOV of the imager, and then moves away from the center of the FOV of the imager over time.

Figure 2A:
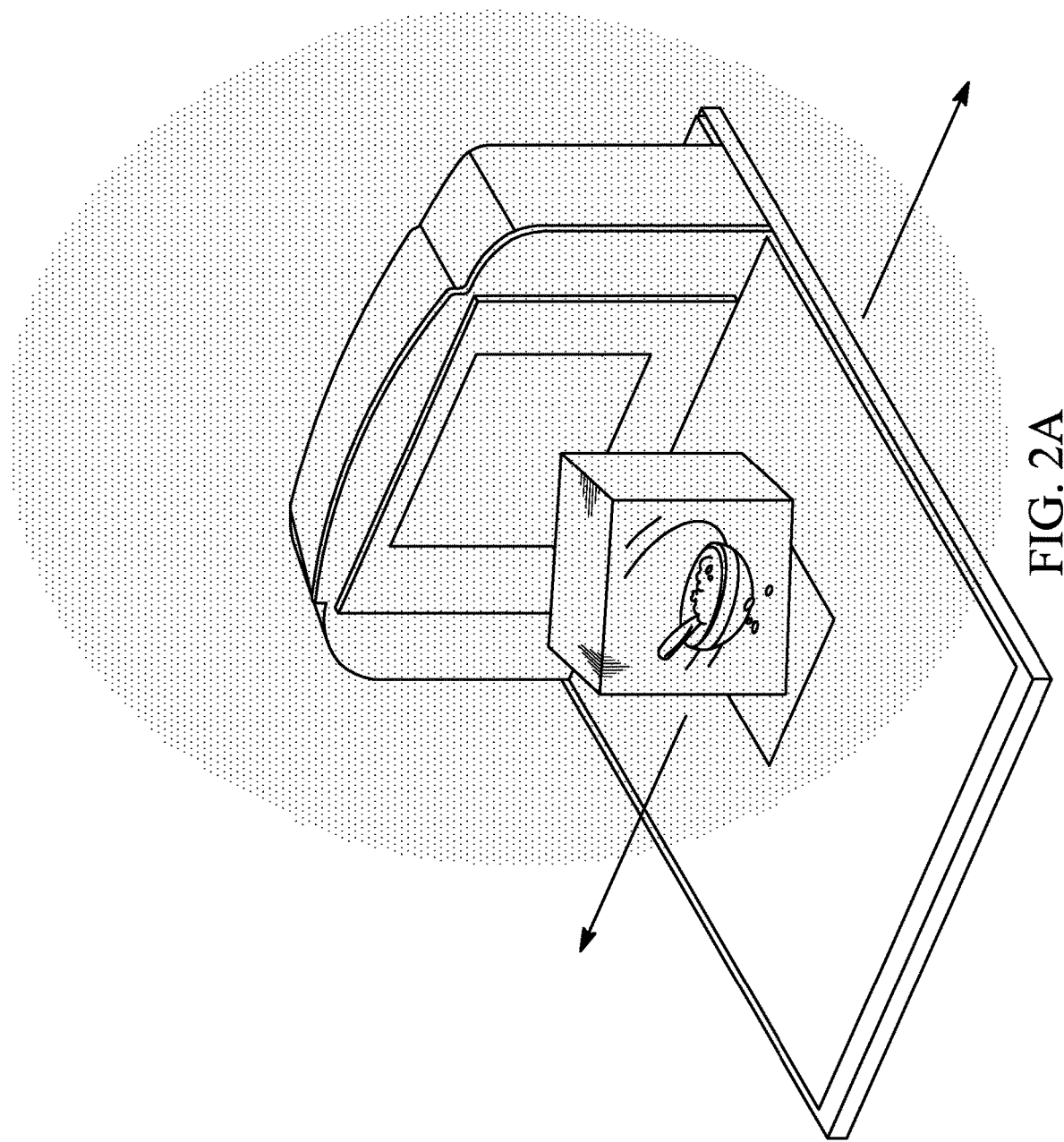
FIG. 2A illustrates an example of a target object moving through a reading range of a radio-frequency identification (RFID) reader at a checkout station.
Figure 2B:
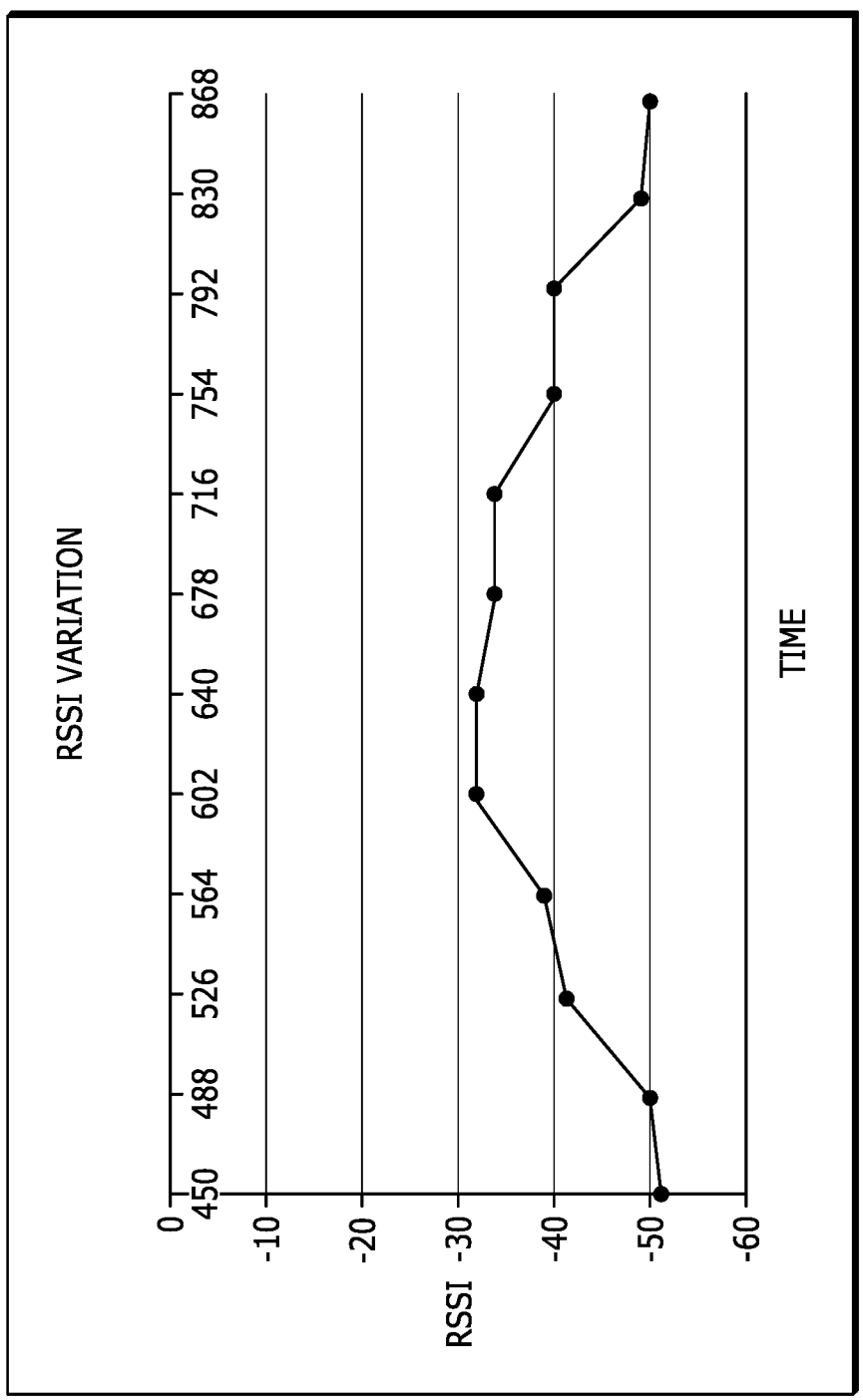
FIG. 2B is a graph illustrating an example series of received signal strengths (RSSI) from an RFID tag attached to the target object of FIG. 2A, as read by the RFID reader of FIG. 2A over time.

FIG. 2A illustrates an example of a target object moving through a reading range of an RFID reader at a checkout station as it is moved through a product-scanning region of the checkout station. FIG. 2B is a graph illustrating an example series of received signal strengths (RSSI) from an RFID tag attached to the target object of FIG. 2A, as read by the RFID reader of FIG. 2A over time. As shown in FIG. 2B, as the target object is moved across the product-scanning region (e.g., as the target object moves from left to right across the product-scanning region), the RSSI of an RFID tag attached to the target object is initially weaker, then generally becomes stronger as the target object moves closer to the RFID reader, then reaches a peak strength as the target object is moved closest to the RFID reader, then generally becomes weaker as the target object moves away from the RFID reader over time.

Figure 3:
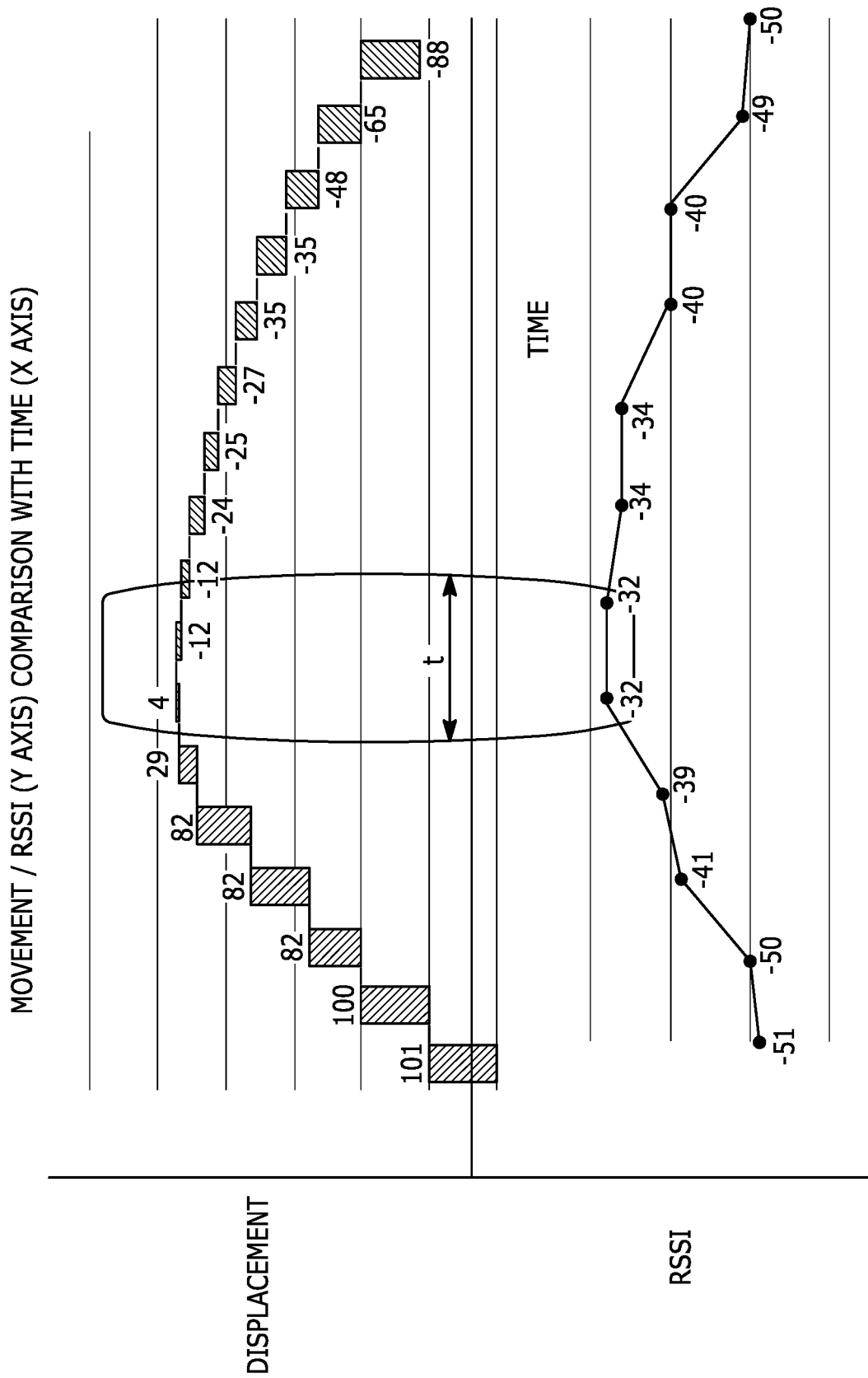
FIG. 3 illustrates an example comparison of the graph of FIG. 1B and the graph of FIG. 2B.

FIG. 3 illustrates an example comparison of the graph of FIG. 1B and the graph of FIG. 2B. For an RFID-tagged item moved through the product-scanning region of the checkout station including the imager and the RFID reader, the variations in both x-axis displacement of the item from the center of the FOV of the imager over time and RSSI over the same timeframe will yield close correlation, as shown in FIG. 3. In particular, for an RFID-tagged item moved through the product-scanning region of the checkout station including the imager and the RFID reader, both the x-axis displacement of the item from the center of the FOV of the imager over time and RSSI over time will peak at the same time or at times within a threshold range of one another, and plotted curves for both the x-axis displacement of the item from the center of the FOV of the imager over time and RSSI over time will illustrate similar patterns. In contrast, the RSSI variation for an RFID tag read by the RFID reader via cross-reading (i.e., an RFID tagged-item being moved through the product-scanning region of another checkout station) will generally yield less correlation to the x-axis displacement variation over the same time period, and will not have a peak that matches the peak in the x-axis displacement of the item from the center of the FOV of the imager over time. Furthermore, RFID tags that are cross-read record lower RSSI, and the RSSI variation for such cross-read RFID tags over time will have a linear change rather than a peaking-followed-by-falling curve. Accordingly, using the techniques of the present disclosure, when the RSSI variation over time for a given RFID tag read by an RFID reader of the checkout station exhibits a pattern that is similar to a pattern in the x-axis displacement variation over time of an item tracked by the imager of the checkout station, a product associated with the RFID tag may be added to a transaction log for that checkout station. In contrast, using the techniques of the present disclosure, when the RSSI variation over time for a given RFID tag read by an RFID reader of the checkout station exhibits a pattern that is not similar to any pattern in the x-axis displacement variation over time of any items tracked by the imager of the checkout station, the product associated with the RFID tag is not added to the transaction log for that checkout station.

Figure 4:
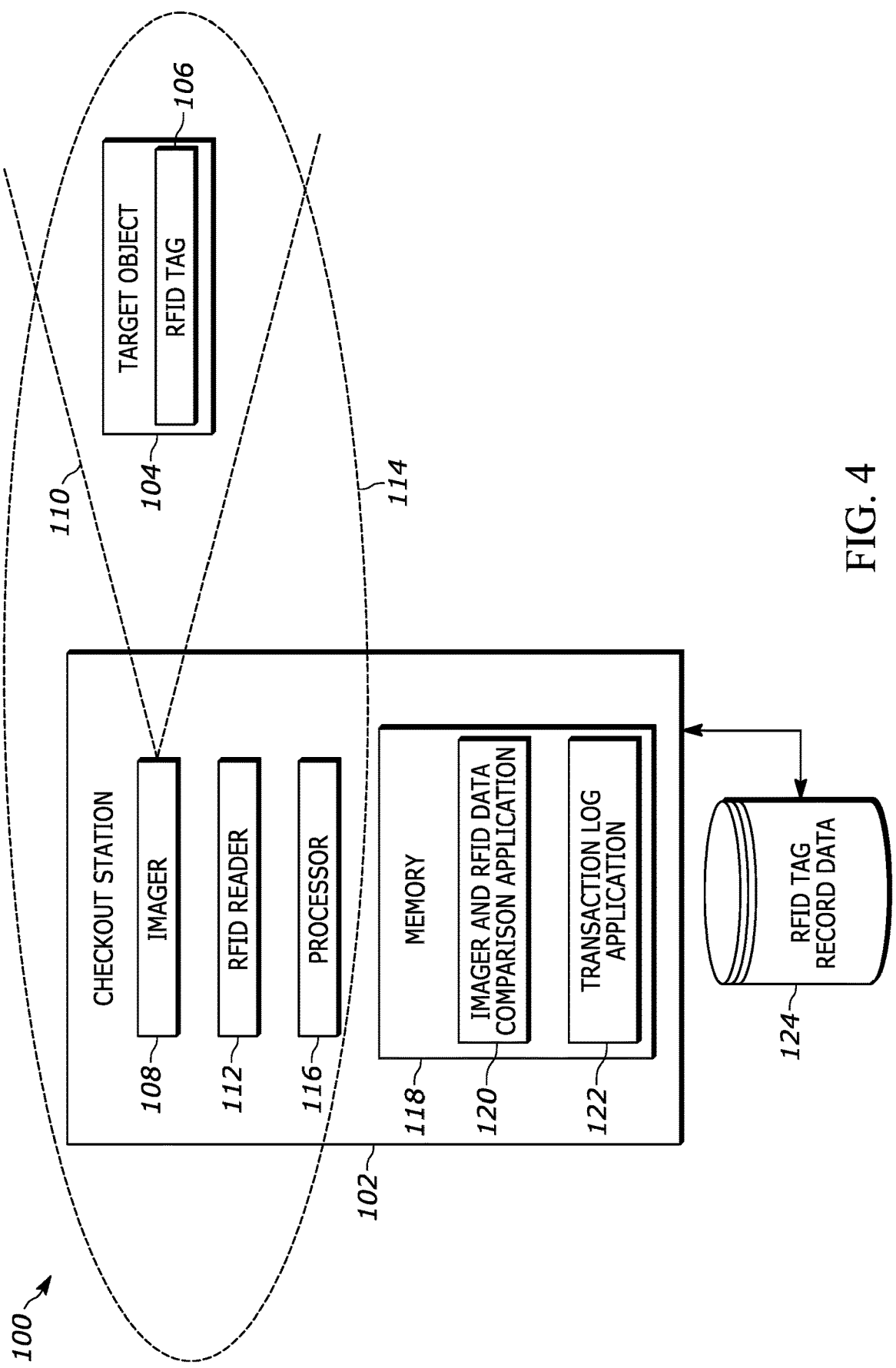
FIG. 4 illustrates a block diagram of an example system including a logic circuit for implementing the example methods and/or operations described herein, including systems and methods for utilizing an imager at a checkout station to eliminate cross-reads by an RFID reader at the checkout station.

FIG. 4 illustrates a block diagram of an example system 100 including a logic circuit for implementing the example methods and/or operations described herein, including systems and methods for utilizing an imager at a checkout station to eliminate cross-reads by an RFID reader at the checkout station. As shown in FIG. 4, the system 100 includes a checkout station 102 and a target object 104 (e.g., an item to be purchased) to which an RFID tag 106 is attached. For example, the target object 104 may be an item to be purchased, and the RFID tag 106 may be associated with information related to the item to be purchased, including, e.g., information about the type of item, the price of the item, etc.

The checkout station 102 may include an imager 108 that has a FOV 110, an RFID reader 112 that has a reading range 114, a processor 116, and a memory 118.

For instance, the imager 108 may be a camera or other image capture device capable of tracking an object in motion as it moves through the FOV 110 of the imager 108. In particular, the imager 108 may measure the displacement of objects (such as the target object 104) that move through the FOV 110 from the center of the FOV 110, e.g., in the x-axis, in the y-axis, or in some other axis, over a certain timeframe. In some examples, the checkout station 102 may include a second imager, with its own FOV, different from the FOV 110. One example arrangement of two such imagers is as shown in FIG. 1A, with a first imager viewing the target object from a first angle while a second imager is arranged to view the target object orthogonally with an orthogonal FOV. Advantageously, such an arrangement allows for an improved working distance, as the range of the RFID reader 112 is typically larger than the FOV of a single imager. That is, as long as the target object 104 is tracked in a FOV of at least one imager, the correlation in time between the variation in the distance of the target object 104 to center of the FOV of that imager can be matched to the change in RSSI observed by the RFID reader 112 over a given timeframe.

The RFID reader 112 may be configured to detect and identify RFID tags (e.g., RFID tag 106) within the reading range 114 of the RFID reader. Moreover, the RFID reader 112 may be configured to measure the received signal strength of each RFID tag over the same timeframe discussed with respect to the imager 108.

Figure 5:
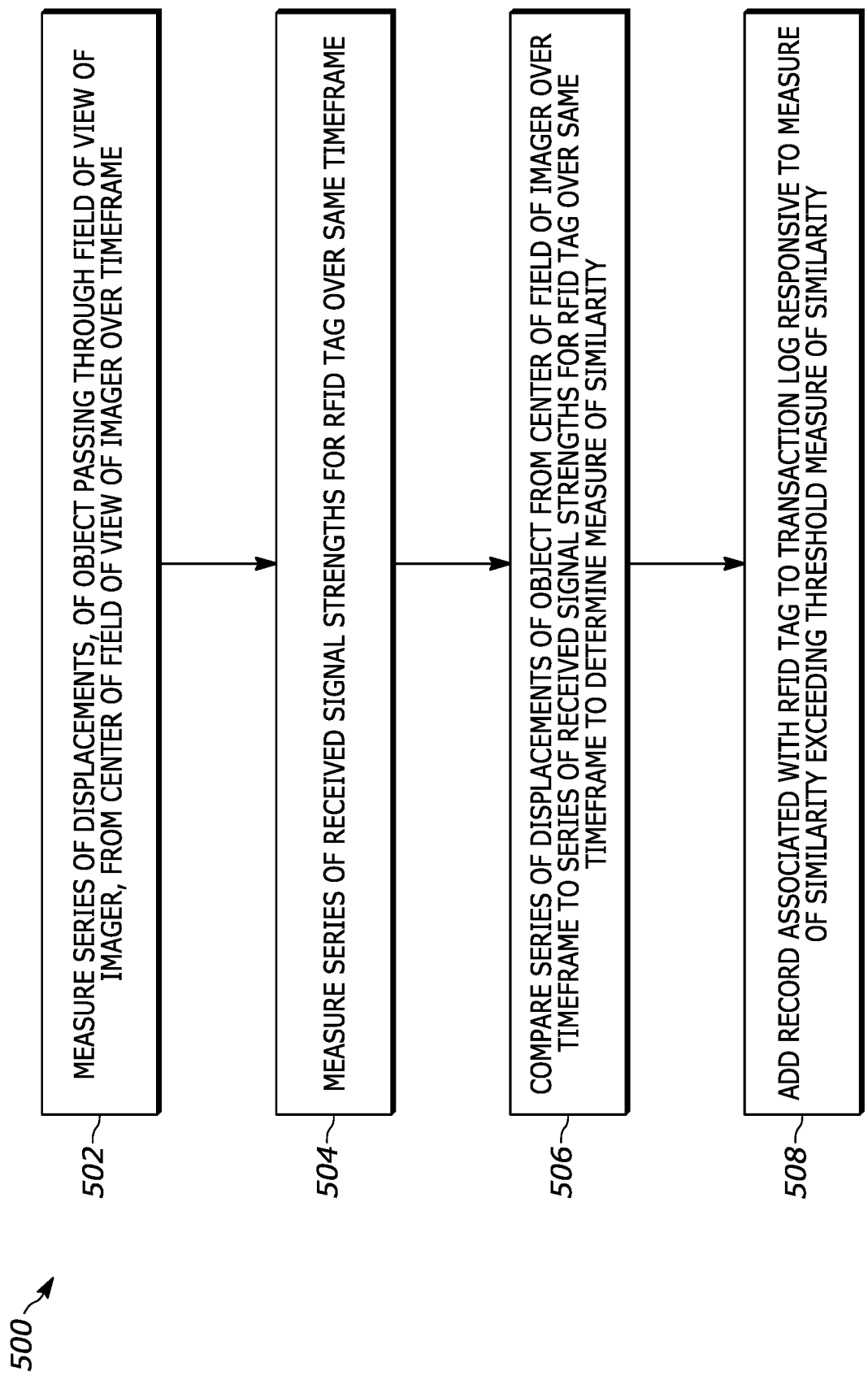
FIG. 5 illustrates a block diagram of an example process as may be implemented by the system of FIG. 4, for implementing example methods and/or operations described herein, including methods for utilizing an imager at a checkout station to eliminate cross-reads by an RFID reader at the checkout station.

The processor 116, which may be, for example, one or more microprocessors, controllers, and/or any suitable type of processors, may interact with the memory 118 accessible by the one or more processors 116 (e.g., via a memory controller) to obtain, for example, machine-readable instructions stored in the memory 118 corresponding to, for example, the operations represented by the flowcharts of this disclosure, including those of FIG. 5. In particular, the machine-readable instructions stored in the memory 118 may include instructions for executing an imager and RFID data comparison application 120 and a transaction log application 122.

For example, executing the imager and RFID data comparison application 120 may include comparing a series of displacements of the one or more objects 104 from the center of the FOV 110 measured by the one or more imagers 108 over the timeframe to a series of the received signal strengths of the detected and/or identified RFID tags 106 measured by the RFID reader 112 over the timeframe in order to determine a measure of similarity between the variation in received signal strength of each of the detected and/or identified RFID tags 106 over the timeframe and the variation of displacement of each of the one or more objects 104 from the center of the FOV 110 over the timeframe. For instance, determining the measure of similarity may include determining whether peaks in each series occur at or near the same time, and/or determining whether each series may be plotted as a similar curve or function. Furthermore, executing the imager and RFID data comparison application 120 may include determining whether the measure of similarity between the variation in received signal strength for any of the RFID tags 106 and variation in displacement of one of the one or more objects 104 from the center of the FOV 110 is greater than a threshold measure of similarity.

For example, executing the transaction log application 122 may include accessing an RFID tag record database 124 storing information corresponding to each of the RFID tags 106, e.g., information related to target objects 104 to which each of the RFID tags 106 is attached, such as information about the type of item, the price of the item, etc., and adding information corresponding to any of the RFID tags 106 for which the measure of similarity is above the threshold measure of similarity to a transaction log for a user of the checkout station 102. For instance, adding information related to a particular item to the transaction log may initiate a purchase of the item by a user of the checkout station 102. Moreover, executing the transaction log application 122 may include removing items corresponding to any of the RFID tags 106 for which the measure of similarity is below the threshold measure of similarity from the transaction log, or not adding these items to the transaction log in the first place.

FIG. 5 illustrates a block diagram of an example process 500 as may be implemented by the system of FIG. 4, for implementing example methods and/or operations described herein, including methods for utilizing an imager at a checkout station to eliminate cross-reads by an RFID reader at the checkout station.

At block 502, an imager associated with a checkout station may measure a series of displacements (e.g., in the x-axis, in the y-axis, or some other axis) of one or more objects from the center of the FOV of the imager as each object passes through the FOV of the imager over a particular timeframe. In particular, the FOV of the imager may include a product-scanning region of a checkout station.

At block 504, an RFID reader associated with the checkout station may detect and/or identify one or more RFID tags, and may measure a series of received signal strengths for the detected and/or identified RFID tags over the same timeframe as the imager measures the series of displacements of the object or objects from the center of the FOV of the imager. For instance, the one or more RFID tags may be attached to or otherwise associated with respective objects of the one or more objects.

At block 506, the series of displacements of the each object from the center of the FOV of the imager over the timeframe may be compared to the series of received signal strengths for each of the RFID tags over the same timeframe to determine a measure of similarity between the series of displacements of each object from the center of the FOV of the imager and the series of received signal strengths for each RFID tag over the timeframe.

In an example, this comparison may include comparing a peak in each series of displacements of each object from the center of the FOV of the imager over the timeframe to a peak in each series of received signal strengths for each of the RFID tags over the same timeframe. For example, the peak in a series of displacements of an object from the center of the FOV of the imager may be a time at which the smallest displacement from the center of the FOV of the imager over the timeframe is measured, and the peak in a series of received signal strengths for an RFID tag over the timeframe may be a time at which the greatest received signal strength is measured. Comparing the peaks in each series to determine the measure of similarity may include determining whether the times at which each peak is measured are the same, or are within a threshold range of time of one another (e.g., within 0.1 seconds of one another, within 0.5 seconds of one another, within 1 second of one another, within 2 seconds of one another, etc.).

Additionally or alternatively, this comparison may include comparing a plotted or otherwise calculated curve of the series of displacements of the object from the center of the FOV of the imager over the timeframe to a plotted or otherwise calculated curve of the series of received signal strengths for the RFID tag. For instance, a function associated with the series of displacements over the timeframe may be compared to a function associated with the series of received signal strengths over the timeframe to determine a measure of similarity between the two functions. For example, functions may be considered similar if they are the same type of function, e.g., both positive linear functions, both negative linear functions, both quadratic functions, etc.

At block 508, when the measure of similarity between the series of displacements of one of the objects from the center of the FOV of the imager and the series of received signal strengths for one of the RFID tags over the timeframe for one of the RFID tags exceeds a threshold measure of similarity, a record associated with that RFID tag may be added to a transaction log for the checkout station, or may be allowed to remain on the transaction log for the checkout station. Moreover, when the series of received signal strengths for one of the RFID tags, when compared to each of the series of displacements of the objects from the center of the FOV of the imager, does not exceed the threshold measure of similarity for the series of displacement associated with any of the objects, a record associated with that RFID tag may not be added to the transaction log for the checkout station, or may be removed from the transaction log for the checkout station.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method, comprising:
    measuring, by an imager, a series of displacements of an object passing through a field of view (FOV) of the imager, from a center of the FOV of the imager, over a timeframe, the FOV of the imager including a product-scanning region;
    measuring, by a radio-frequency identification (RFID) reader, a series of received signal strengths for an RFID tag over the same timeframe;
    comparing the series of displacements of the object from the center of the FOV of the imager over the timeframe to the series of received signal strengths for the RFID tag over the timeframe to determine a measure of similarity between the series of displacements of the object from the center of the FOV of the imager over the timeframe and the series of received signal strengths for the RFID tag over the timeframe; and responsive to the measure of similarity exceeding a threshold measure of similarity, adding a record associated with the RFID tag to a transaction log.

2. The method of claim 1, wherein the RFID tag is attached to or otherwise associated with the object.

3. The method of claim 1, wherein comparing the series of displacements of the object from the center of the FOV of the imager over the timeframe to the series of received signal strengths for the RFID tag over the same timeframe includes:
comparing a first time within the timeframe associated with a peak in the series of displacements of the object from the center of the FOV of the imager over the timeframe to a second time within the timeframe associated with a peak in the series of received signal strengths for the RFID tag.

4. The method of claim 1, wherein comparing the series of displacements of the object from the center of the FOV of the imager over the timeframe to the series of received signal strengths for the RFID tag over the same timeframe includes:
comparing a curve of the series of displacements of the object from the center of the FOV of the imager over the timeframe to a curve of the series of received signal strengths for the RFID tag.

5. The method of claim 1, wherein the RFID tag is a first RFID tag, the series of received signal strengths is a first series of received signal strengths, and the measure of similarity is a first measure of similarity, and further comprising:
measuring, by the RFID reader, a second series of received signal strengths for a second RFID tag over the same timeframe;
comparing the series of displacements of the object from the center of the FOV of the imager over the timeframe to the second series of received signal strengths for the second RFID tag over the timeframe to determine a second measure of similarity between the series of displacements of the object from the center of the FOV of the imager over the timeframe and the second series of received signal strengths for the second RFID tag over the timeframe; and
responsive to the second measure of similarity failing to exceed the threshold measure of similarity, not adding any record associated with the second RFID tag to the transaction log.

6. An apparatus including:
an imager configured to measure a series of displacements of one or more objects passing through a field of view (FOV) of the imager, from a center of the FOV of the imager, over a timeframe, the FOV of the imager including a product-scanning region;
a radio-frequency identification (RFID) reader configured to measure a series of received signal strengths for an RFID tag over the same timeframe;
a memory storing computer-readable instructions; and
a processor configured to execute the computer-readable instructions stored on the memory to:
compare the series of displacements of the object from the center of the FOV of the imager over the timeframe to the series of received signal strengths for the RFID tag over the timeframe to determine a measure of similarity between the series of displacements of the object from the center of the FOV of the imager over the timeframe and the series of received signal strengths for the RFID tag over the timeframe; and
responsive to the measure of similarity exceeding a threshold measure of similarity, adding a record associated with the RFID tag to a transaction log.

7. The apparatus of claim 6, wherein the RFID tag is attached to or otherwise associated with the object.

8. The apparatus of claim 6, wherein the processor is configured to execute the computer-readable instructions stored on the memory to compare the series of displacements of the object from the center of the FOV of the imager over the timeframe to the series of received signal strengths for the RFID tag over the same timeframe by:
comparing a first time within the timeframe associated with a peak in the series of displacements of the object from the center of the FOV of the imager over the timeframe to a second time within the timeframe associated with a peak in the series of received signal strengths for the RFID tag.

9. The apparatus of claim 6, wherein the processor is configured to execute the computer-readable instructions stored on the memory to compare the series of displacements of the object from the center of the FOV of the imager over the timeframe to the series of received signal strengths for the RFID tag over the same timeframe by:
comparing a curve of the series of displacements of the object from the center of the FOV of the imager over the timeframe to a curve of the series of received signal strengths for the RFID tag.

10. The apparatus of claim 6, wherein the RFID tag is a first RFID tag, wherein the series of received signal strengths is a first series of received signal strengths, wherein the measure of similarity is a first measure of similarity, wherein the RFID reader is further configured to measure a second series of received signal strengths for a second RFID tag over the same timeframe, and wherein the processor is configured to execute the computer-readable instructions stored on the memory to:
compare the series of displacements of the object from the center of the FOV of the imager over the timeframe to the second series of received signal strengths for the second RFID tag over the timeframe to determine a second measure of similarity between the series of displacements of the object from the center of the FOV of the imager over the timeframe and the second series of received signal strengths for the second RFID tag over the timeframe; and
responsive to the second measure of similarity failing to exceed the threshold measure of similarity, not add any record associated with the second RFID tag to the transaction log.

* * * * *